United States Patent [19]
Likavec

[11] 3,721,453
[45] March 20, 1973

[54] SEAL CONSTRUCTION
[75] Inventor: Paul F. Likavec, Detroit, Mich.
[73] Assignee: Chandler Evans Inc., West Hartford, Conn.
[22] Filed: Feb. 1, 1971
[21] Appl. No.: 111,458

[52] U.S. Cl. ..................277/30, 285/264, 277/79
[51] Int. Cl. ...........................................F16j 15/38
[58] Field of Search..............277/30, 31, 74, 79, 5; 285/264

[56] References Cited

UNITED STATES PATENTS

| | | | |
|---|---|---|---|
| 1,771,250 | 7/1930 | Feild | 277/30 |
| 3,289,791 | 12/1966 | Ulinski | 277/30 |
| 3,547,452 | 12/1970 | Hirata | 277/30 |
| 2,928,685 | 3/1960 | Tracy | 277/74 |

Primary Examiner—Samuel B. Rothberg
Attorney—Radford W. Luther

[57] ABSTRACT

A seal construction for a pivotally mounted lever includes a housing which surrounds a rounded intermediate portion of the lever. A pair of spaced seals are interposed between the housing and the rounded portion.

7 Claims, 2 Drawing Figures

INVENTOR
PAUL F. LIKAVEC
BY Radford W. Luther
ATTORNEY

SEAL CONSTRUCTION

BACKGROUND OF THE INVENTION

The instant invention relates generally to seal structures and more particularly to seals between two fluid mediums. Even more particularly, the instant invention relates to seal arrangements for movable members which extend between cavities respectively containing a liquid and a gas.

In certain devices, it is necessary to place a seal around a movable member which extends between a first cavity containing a first fluid, such as gas, and a second cavity containing a second fluid, such as a liquid, to transmit a signal (such as a pressure), which is represented as movement of the movable member, from the first cavity to the second cavity. For example, in a fuel control for a gas turbine engine it is necessary to convert compressor discharge pressure into a signal (e.g., a force signal) which the control can utilize. Typically, a diaphragm senses this pressure and is moved thereby; and a pivotable lever, resting upon the diaphragm and extending into a fuel filled cavity in the fuel control, transmits this movement to a valve or other device to which it is connected.

In the past, rotary seals and bellows type seals have been employed in such controls. The difficulty with the rotary type seal is that the lever construction must occupy a relatively large space. Hysteresis is also a problem with this type of seal because of friction. If a pivotable lever is employed and a bellows type seal is utilized to seal the air from the fuel, the lever will be sensitive to the pressure forces exerted upon the bellows and the inherent spring forces in the bellows. Therefore, in the latter case, the maximum lever deflections must remain extremely small to insure accurate sensing of the compressor discharge pressure parameter.

SUMMARY OF THE INVENTION

The invention is basically a sealing arrangement for a pivotally mounted lever which extends between a cavity containing a first fluid and a cavity containing a second fluid. Typically, a seal arrangement of the invention may embody a pair of spaced seals interposed between a rounded portion of the lever and a housing, thereby forming a fail-safe seal.

A seal arrangement according to the invention exhibits an insensitivity to pressure forces, has low friction, and possesses a minimal spring rate. In addition to the above qualities, a seal construction according to the invention is relatively compact and economical to manufacture.

It is a primary object of the invention to provide a seal construction for a movable member extending between cavities respectively containing two dissimilar fluids.

It is another object to provide a seal construction for a movable member wherein the seal construction does not render the movable member pressure sensitive or impose a spring rate there-upon.

Yet another object is to provide a seal construction for a movable member which extends between cavities respectively containing a liquid and a gas, wherein the member is subjected to a minimum friction force.

A further object is to provide an economical seal construction for a fuel control system.

Other objects and advantages will become apparent from the following detailed description taken in conjunction with the accompanying drawings.

DETAILED DESCRIPTION OF PREFERRED EMBODIMENT

Figure 1:
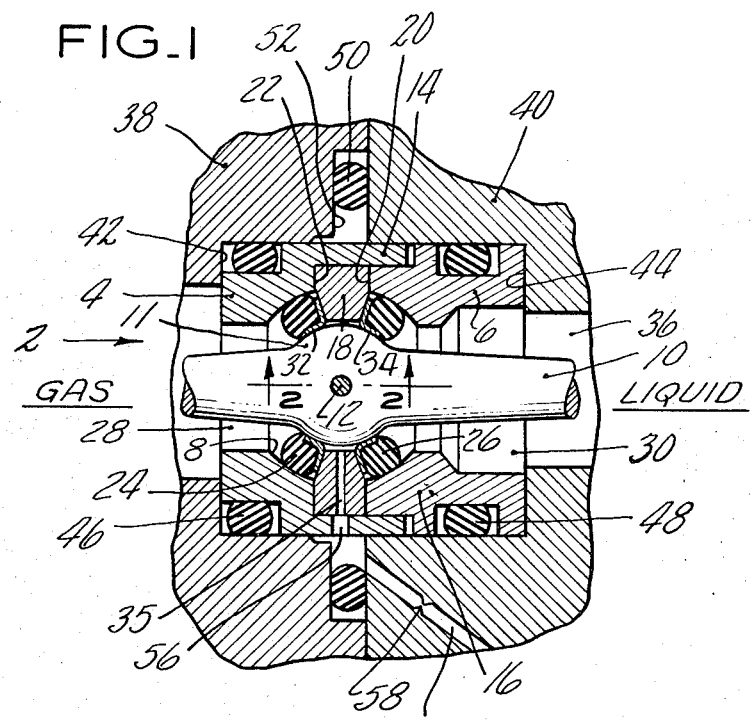
FIG. 1 is a fragmentary sectional elevational view of a seal construction according to the invention.
Figure 2:
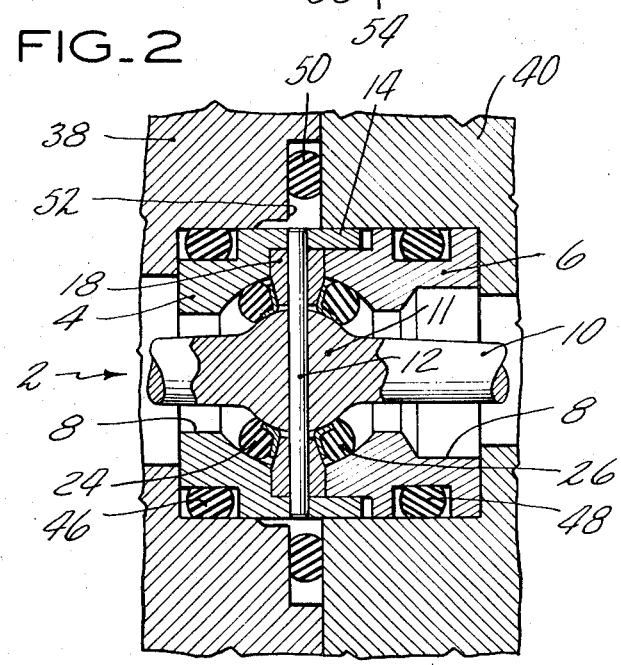
FIG. 2 is a fragmentary sectional view of the seal construction of FIG. 1, taken along the line 2—2.

Referring to FIGS. 1 and 2, there is shown a seal housing, generally shown at 2, defined by annular retainer members 4 and 6. The interior walls of the retainer members 4 and 6 form an interior chamber 8 in which a lever 10 is mounted. The lever 10 is mounted for pivotal movement about an axis within the chamber 8 by means of a pivot structure, shown as a pin 12 which extends through a rounded intermediate portion 11 of the lever, portion 11 being spaced from the housing. The pin 12 has its ends inserted within aligned apertures in an extension 14 of the member 4.

An extension 16 of the member 6 is received within the extension 14 such that the inner and outer peripheries of the respective extensions 14 and 16 are contiguous. A ring member 18 having bevelled lateral sides surrounds the rounded portion 11 of the lever 10 and is radially spaced therefrom. The ring member 18 is interposed between the members 4 and 6 in firm contact with the inboard end 20 of the member 6 and a shoulder 22 of the member 4. As can be seen in FIGS. 1 and 2, the outer surface of the ring member 18 is contiguous with the inner periphery of the extension 14 and is flush with the outer periphery of the extension 16. The ring member 18 also includes a pair of diametrically opposed apertures through which the pin 12 extends. Also, it will be noted that the diameter of the chamber 8 progressively decreases immediately adjacent the ring member 18 in both outboard directions. It will be appreciated that the ring member 18 could be formed integral with either the member 4 or 6, but that a separate ring member facilitates assembly of the seal 2.

A first circumferential seal 24 and a second circumferential seal 26 are interposed between and in contact with the respective members 4 and 6 and the rounded portion 11 in spaced parallel relationship, thereby defining cavities 28 and 30 which are sealed from each other. Each of the seals conforms to the respective peripheries of the chamber and rounded portion adjacent thereto. The seals 24 and 26 comprise rings, which could, for example, be O-rings or quad seals preferably made of an elastomeric material, although any deformable material would obviously be suitable. It will be noted that the axes of the respective seals 24 and 26 are generally perpendicular to the axis of movement of the lever 10. In order to prevent scuffing of the deformable rings when the lever 10 is pivoted about its axis of rotation, the seals 24 and 26 respectively comprise a pair of annular bearing elements 32 and 34, made of a bearing material such as Teflon and having L-shaped cross sections, disposed between the rounded portion 11 and the respective seals 24 and 26, the inboard sides of these elements abutting the bevelled surfaces of the ring member 18. It will be noted that the seals are immovably retained with the chamber 8 since they cannot be displaced in an outboard direction because of the chamber geometry. The ring member 18 embodies a radial drain passage 35 which is adapted to drain off any fluid which might leak into the annular volume defined by the interior periphery of the ring member 18, the rounded portion 11, and the elements 32 and 34.

The seal construction itself is contained within a recess 36 formed within two abutting main housing structures 38 and 40, which may be portions of a fuel control housing. The members 4 and 6 are retained in close fitted engagement with the structures 38 and 40 within a central portion of the recess 36, which is cylindrical in shape. The lateral faces of the outboard ends of the members 4 and 6 abut the shoulders 42 and 44 of the structures 38 and 40, respectively, so that the end 20 and the shoulder 22 bear against the sides of the ring member 18. To prevent leakage of fluid between the seal members and structures from the portion of the recess 36 which contains a fluid under a pressure higher than that of the other portion of the recess, a pair of seals 46 and 48 (which may, for example, be O-rings or gaskets) are located in suitable grooves adjacent the structures on the respective members 4 and 6. Another seal 50 is positioned in a groove 52 in the structure 38 to prevent possible leakage between the area of contact between the structures 38 and 40.

A drain passage 54 in the structure 40 communicates with the groove 52, radially inwardly of the seal 50 to drain off fluid in the groove 52. Should either of the fluids in the recess 36 leak past an adjacent bearing element 32 or 34, it will be ducted to the groove 52 via passage 34 and an aperture 56 in the extension 14 of the element 4 to thereby prevent mixing of the two fluids.

In some applications, it may be necessary to insure that the loss of fluid or pressure does not exceed an acceptable limit in the event of a seal failure. In order to forestall such an undesirable eventuality, a sized restriction 58 may be included in the drain passage 54. It should be obvious that either passage 35 or aperture 56 would also be suitable locations for the incorporation of a restriction.

A salutary feature of the illustrated design that the pivot axis of the lever 10 need not be exactly perpendicular to the axis of the lever 10 as slight deviations therefrom will not impair the seal because of the spherical shape of the rounded portion 11. Another feature is that deterioration of one of the seals 24 and 26 will not destroy the seal. For example, assuming that cavity 30 contains a liquid under high pressure and cavity 28 contains a gas under low pressure, upon failure of seal 26, the liquid will merely flow out of the passage 35 since the seal 24 will prevent communication between cavity 28 and cavity 30. Still another feature of the instant invention is the reduced friction forces to which the lever is subjected. The pin mounting of the lever 10 permits the bearing surface which the rounded portion 11 slides over to be reduced to a minimum as it is the pin 12, not the bearing surface, which guides the pivoting motion of the lever. This latter feature significantly reduces hysteresis in a system with which the lever is associated.

It will be understood that the invention has been described by way of illustration rather than limitation and that various modifications and substitutions may be made without departing from the scope or spirit of the invention as defined in the subjoined claims. For example, the rounded portion 11 could be ellipsoidal or cylindrical, instead of spherical, as shown. In like manner, the seals 24 and 26 need not be shaped as tori, as shown. Also, the housing members 4 and 6 could be formed integral with the respective structures 38 and 40 or with each other.

What is claimed is:

1. In a seal construction, the combination comprising:
   a housing having a chamber therein;
   a lever having a rounded portion, the rounded portion being disposed at least partially within the chamber and spaced from the housing;
   a pivot structure interconnecting the rounded portion and the housing such that the lever is mounted for guided pivoting movement about a fixed axis extending through the rounded portion and located within the chamber and such that loads imposed upon the lever are transmitted to the housing by the structure;
   first and second circumferential seals, each comprising a deformable material, immovably retained in spaced parallel relationship in the chamber between and in contact with the housing and the rounded portion such that pivoting movement of the lever causes the rounded portion to slide over the seals, each seal conforming to the respective peripheries of the chamber and rounded portion adjacent thereto and having an axis transverse to the axis of pivoting of the lever and;
   means to drain off fluid adjacent the rounded portion and intermediate the seals.

2. The combination of claim 1, wherein the draining means comprises:
   a passage; and
   a restriction in the passage.

3. The combination of claim 1, wherein the rounded portion is spherical in shape.

4. A seal construction comprising:
   a housing having a chamber therein;
   a lever having a spherical portion, the spherical portion being disposed at least partially within the chamber and spaced from the housing; means to interconnect the spherical portion and the housing for mounting the lever for guided pivoting movement about a fixed axis extending through the spherical portion and located within the chamber and for transmitting loads imposed upon the lever to the housing;
   first and second circumferential seals immovably retained in the chamber between the housing and the spherical portion in parallel spaced relationship, and the axes of the seals being perpendicular to the axis of movement of the lever, each seal conforming to and in contact with the respective peripheries of the chamber and the rounded portion adjacent thereto;
   a ring member mounted within the housing radially spaced from the spherical portion and located intermediately of the seals, the ring member having an axis perpendicular to the axis of rotation of the lever, the ring member having a passage to drain off fluid in the volume defined between the ring member, the seals and the spherical portion, the housing having an aperture in communication with the passage for receiving fluid from the passage and thereby providing a drainage path to the exterior of the housing.

5. The seal construction of claim 4, wherein the interconnecting means comprises:
a pin mounted to the housing within the chamber for pivotally mounting the lever, the pin extending through the spherical portion and the ring member; and wherein each seal comprises:
a ring of elastomeric material; and
bearing means to prevent scuffing of the ring by the spherical portion when the lever is pivoted.

6. The seal construction of claim 5, wherein the housing comprises:

two annular seal retainer members, one of the retainer members being partially received within the other of the retainer members, the retainer members each contacting the ring member; and wherein the contour of the chamber proximate the spherical portion narrows in the outboard directions therefrom; and wherein each of the bearing means comprises:
an annular bearing element having an L-shaped cross section, the bearing element contacting the ring, the ring member and the spherical portion.

7. The combination of claim 1, wherein each seal comprises:
a ring of elastomeric material; and
an annular bearing element interposed between the ring and the rounded portion to prevent scuffing of the elastomeric material when the lever is pivoted.

* * * * *